United States Patent [19]

Nagakura

[11] Patent Number: 5,010,329
[45] Date of Patent: Apr. 23, 1991

[54] BLOCK POLLING DATA COMMUNICATION SYSTEM HAVING OPTIMUM BLOCK DETERMINATION MEANS

[75] Inventor: Kaoru Nagakura, Kawasaki, Japan
[73] Assignee: Fujitsu Limited, Kawasaki, Japan
[21] Appl. No.: 562,412
[22] Filed: Aug. 2, 1990

Related U.S. Application Data

[63] Continuation of Ser. No. 180,320, Apr. 11, 1988, abandoned.

[30] Foreign Application Priority Data

Apr. 10, 1987 [JP] Japan ................... 62-88507

[51] Int. Cl.$^5$ ............................................. G05B 23/02
[52] U.S. Cl. .......................... 340/825.080; 340/825; 370/85.8; 370/95.2
[58] Field of Search ............ 379/93, 28; 364/900, 364/919; 340/825.08, 825; 370/85.8, 95.2

[56] References Cited

U.S. PATENT DOCUMENTS

4,149,144 4/1979 Diefenderfer ................. 370/96 X

FOREIGN PATENT DOCUMENTS

| | | | |
|---|---|---|---|
| 48-006622 | 1/1973 | Japan . | |
| 0116805 | 9/1979 | Japan | 340/825.08 |
| 0040345 | 4/1981 | Japan | 340/825.08 |
| 56-128048 | 10/1981 | Japan . | |
| 58-018031 | 4/1983 | Japan . | |
| 58-129840 | 8/1983 | Japan . | |
| 59-085158 | 5/1984 | Japan . | |
| 0274545 | 12/1986 | Japan | 340/825.08 |
| 0274546 | 12/1986 | Japan | 340/825.08 |

OTHER PUBLICATIONS

Christensen et al., "Adaptive Polling", IBM Technical Disclosure Bulletin, vol. 19, No. 7, pp. 2721-2727, Dec. 1976.
Farr et al., "Dynamically Optimized Polling System," IBM Technical Disclosure Bulletin, vol. 20, No. 2, pp. 774-775, Jul. 1977.

*Primary Examiner*—Ulysses Weldon
*Attorney, Agent, or Firm*—Staas & Halsey

[57] ABSTRACT

An improved data communication system in which a block polling of a plurality of terminal blocks is first carried out, thereafter, a terminal polling of terminals in the terminal block(s) from which a response to the block polling has been issued is carried out. The data communication system includes a center office, a cable and a plurality of terminals which can be grouped in a plurality of terminal blocks. The center office includes a MODEM, a block polling unit, a response monitor unit for detecting a data transfer request signal from the terminal blocks during the block polling, and a terminal polling unit which sequentially effects a polling of terminals in the terminal block from which the request signal has been issued. The center office further includes a unit for determining optimum terminal numbers for the respective terminal blocks and allocating terminals in the respective terminal blocks in response to the data transfer request signals from the terminals during the terminal polling, to minimize a total polling time. The block polling unit and the terminal polling unit then carry out their respective pollings on the basis of the newly allocated terminal blocks and terminals.

27 Claims, 10 Drawing Sheets

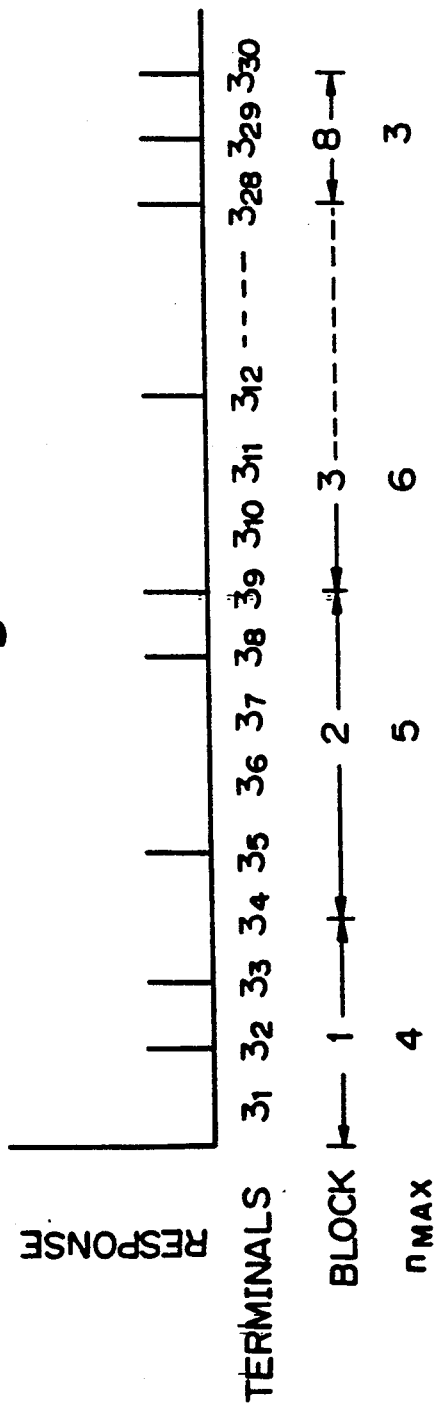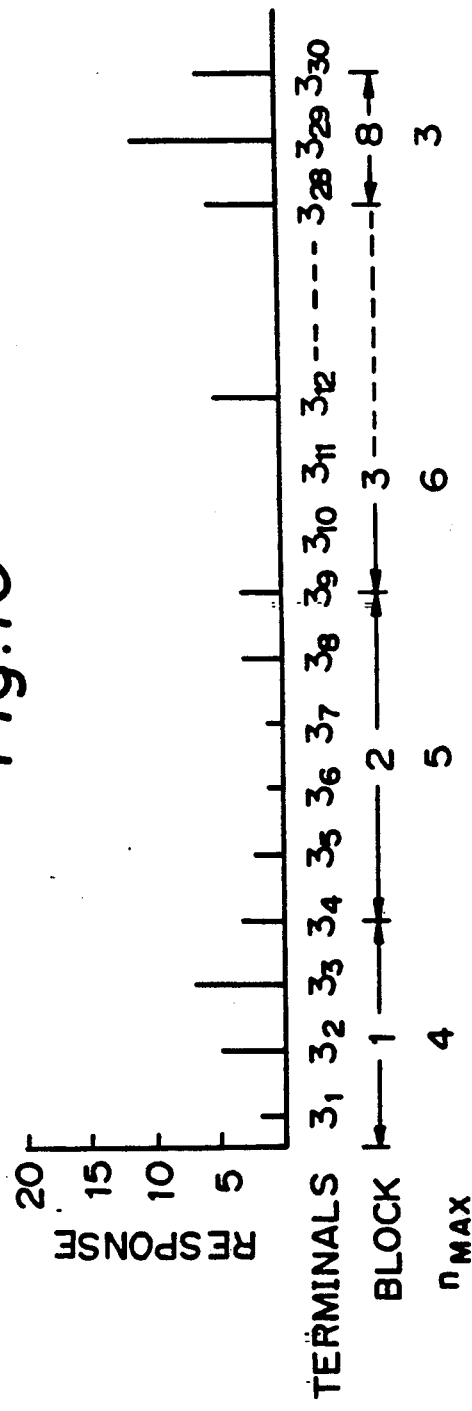

BLOCK POLLING DATA COMMUNICATION SYSTEM HAVING OPTIMUM BLOCK DETERMINATION MEANS

This is a continuation of copending application Ser. No. 07/180,320 filed on Apr. 11, 1988, now abandoned.

BACKGROUND OF THE INVENTION

1. Field of the Invention

The present invention relates to a data communication system. More particularly, it relates to a polling data communication system in which, first, a polling is carried out from a center office to a plurality of terminal blocks, each consisting of terminals, to detect a request for a data transfer therefrom, and second, a polling is carried out from the center office to all of the terminals in the terminal block which issues the request.

2. Description of the Related Art

In a data communication system including a center office and a plurality of terminals connected to the center office through a cable, for example, in a cable television (CATV) system, polling is employed to communicate between the center office and the terminals. More specifically, the center office sequentially sends an inquiry signal to all terminals by a polling method to detect requests for a data transfer from the center office to terminals requesting the data transfer. However, this simple terminal polling method suffers from a drawback of superfluous pollings, because not all of the terminals always request the data transfer, and thus unnecessary pollings of terminals which have not requested a data transfer is carried out. As a result, this simple terminal polling method suffers from a drawback of a long polling time.

To overcome this drawback, a block (or group) polling method is employed. The terminals are previously grouped into a plurality of blocks, each block having an equal number of terminals. First, the center office sequentially sends an inquiry signal to the terminal blocks and detects the existence of a data transfer request(s) from the terminal(s) in each terminal block. Second, the center office sequentially sends an inquiry signal to all terminals which are grouped in the terminal blocks in which the data transfer requests were made. On the other hand, the center office does not carry out a polling of terminals grouped in the terminal blocks in which no terminal has requested a data transfer. As a result, the total polling number can be reduced, thus shortening the total polling time.

Generally, the frequency of data transfer requests varies in accordance with the time, the day of the week, regions where the terminals are installed, programs provided from the center office, etc. For example, in the CATV system, demands from a region wherein most people work during the day are low during the daytime on weekdays, but are high at night. Also, the demands depend upon the programs provided from the center office. However, the terminals grouped in each block are fixed, and the number of the terminals in each block is constant. As a result, the prior art block polling system still suffers from a drawback of superfluous pollings during the day.

The prior art block polling data communication system will be described later with reference to the drawings.

SUMMARY OF THE INVENTION

An object of the present invention is to provide an improved block polling data communication system for further shortening a total polling time.

According to the present invention, there is provided a block polling data communication system including a center office, a plurality of terminals, and a cable connecting the center office and the terminals. The center office includes a MODEM unit, operatively connected to the cable, for modulating transmission data and demodulating reception data, a block polling unit, operatively connected to the MODEM unit, for effecting a polling of a plurality of terminal blocks each containing at least one terminal, a response monitor unit, operatively connected to the block polling unit to cooperate therewith, for detecting and storing a request signal for a data transfer from a terminal in the terminal block of which the polling is effected, and a terminal polling unit, operatively connected to the MODEM unit and the response monitor unit, for sequentially effecting a polling of all of the terminals in the terminal block(s) in which at least one terminal has responded to the polling from the block polling unit to request the data transfer. The block polling data communication system further includes a terminal and block rearrangement unit for counting request signals from respective terminals of which the pollings from the terminal polling unit are effected, determining optimum terminal numbers to minimize a total polling time in accordance with the counted request signals, and rearranging respective terminal blocks in accordance with the optimum terminal numbers. The block polling unit effects the polling of the terminal blocks rearranged by the terminal and block rearrangement unit. Also, the terminal polling unit effects the polling of the terminal(s) in the terminal blocks determined at the terminal and block rearrangement unit, the terminal blocks having the terminals issued the request signal.

Each terminal has a terminal address. The block polling unit outputs a pair of a begin terminal address and an end terminal address of the terminal block to be polled in the block polling of all of the terminals, the begin terminal address and the end terminal address of each terminal block being defined by the arrangement of the terminal in each determined terminal block, the terminals responding to the block polling when the terminal addresses thereof are within the begin and end terminal addresses and the terminals have requested data transfers from the center office. The terminal polling unit outputs a terminal address of the terminal to be polled in the terminal polling, the terminal responding to the terminal polling when the terminal address coincides with the terminal address thereof and the terminal has requested a data transfer from the center office.

Each terminal may include a MODEM unit operatively connected to the cable, for modulating transmission data and demodulating reception data, a reception unit operatively connected to the MODEM unit, for receiving data from the center office, a transmission unit, operatively connected to the MODEM unit, for transmitting data to the center office, a block polling detection unit, operatively connected to the reception unit, for detecting a block polling by comparing the terminal address thereof and the begin and end terminal addresses from the center office through the reception unit, a terminal polling detection unit, operatively connected to the reception unit, for detecting the terminal polling thereof by comparing the terminal address thereof and the terminal address from the center office, and a control unit, operatively connected to the block polling detecting unit, the terminal polling detecting unit and the transmission unit, for outputting a request signal to the center office through the transmission unit and the MODEM unit in response to the block polling or the terminal polling, and the request of the data transfer thereof.

The terminal and block rearrangement unit may include a table containing total polling times depending upon the average request ratio and terminal numbers, calculate an average request ratio, and determine the terminal blocks to include a substantially equal number of terminals in each terminal block, in a table look-up manner, using the average request ratio.

The terminal and block rearrangement unit may determine optimum terminal numbers in each terminal block to minimize the total polling time, the respective optimum terminal numbers of the terminal blocks being determined differently by a mathematical programming, and rearrange terminal blocks in accordance with the determined optimum terminal numbers.

The terminal and block rearrangement unit may calculate an average request ratio, define a threshold level in accordance with the average request ratio, and determine terminal numbers and terminal blocks by accumulating the counted request number of the terminals during the terminal polling and comparing the accumulated request number and the threshold level.

The terminal and block rearrangement unit may be operated after every completion of the polling by the terminal polling unit.

The terminal and block rearrangement unit may be periodically operated for a long period, such as, ten minutes, one hour, one day.

The terminal and block rearrangement unit may be operated on demand by an operator.

BRIEF DESCRIPTION OF THE DRAWINGS

Other objects and features of the present invention will be described in more detail with reference to the drawings, in which

FIGS. 8a to 8c are views representing a blocking by the center office shown in FIG. 3;

FIGS. 9 and 10 are graphs representing distributions of data transfer requests from the terminals during a terminal polling and a determination of optimum terminal numbers and terminal blocks, in accordance with the present invention.

DETAILED PREFERRED EMBODIMENTS

Before describing the preferred embodiments of block polling data communication systems in accordance with the present invention, an example of a prior art block polling data communication system will be described with reference to the drawings, to describe block polling in more detail and to distinguish the differences between the prior art and the present invention.

Figure 1:
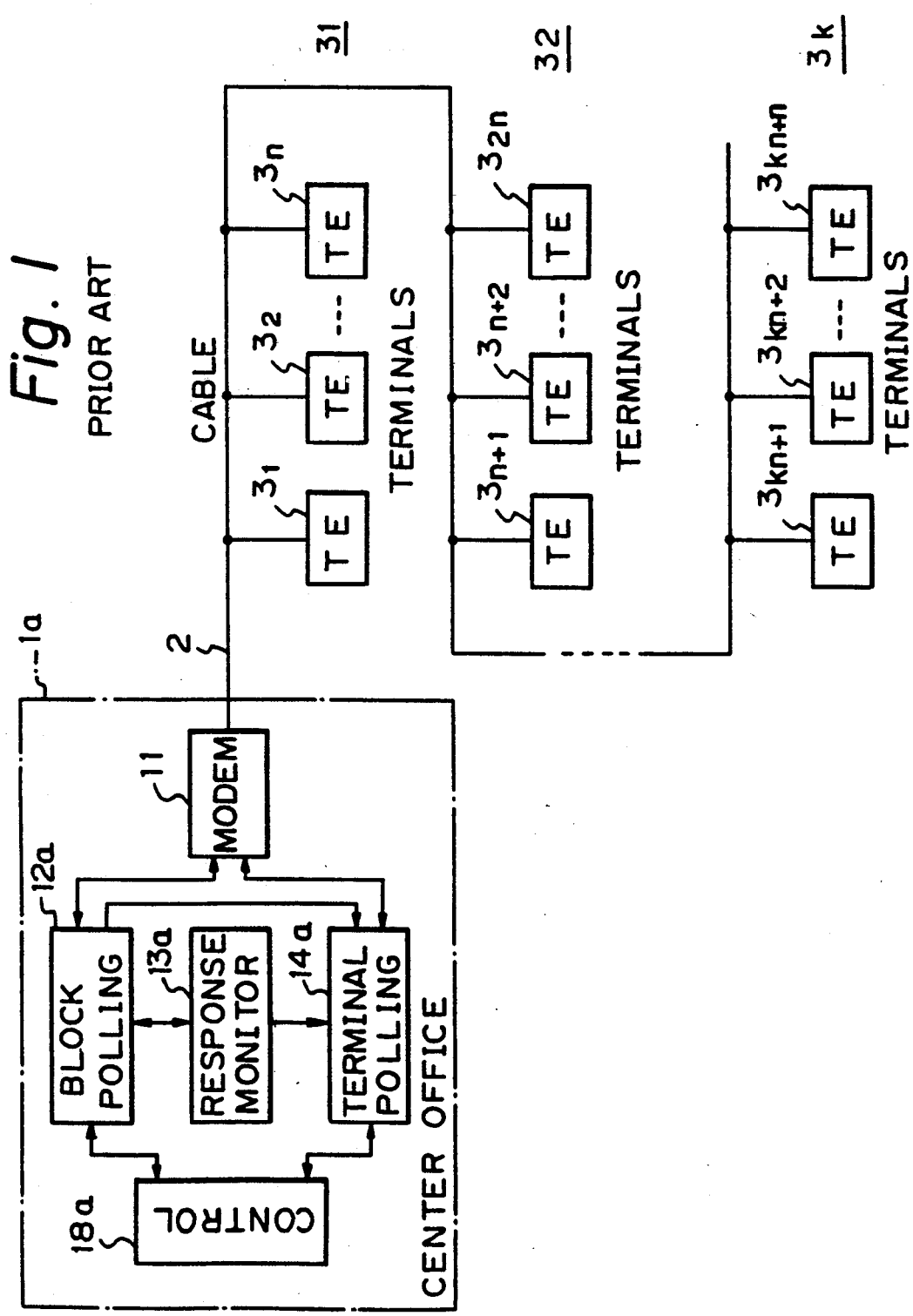
FIG. 1 is a block diagram of a prior art block polling data communication system.

Referring to FIG. 1, a prior art block polling data communication system includes a center office $1a$, a cable 2 and a plurality of terminals $3_1$ to $3_{kn+n}$ connected to the center office $1a$ through the cable 2. The center office $1a$ is composed of a modulation and demodulation unit (MODEM) 11, a block polling unit $12a$, a response monitor unit $13a$, a terminal polling unit $14a$ and a control unit $18a$. Each terminal includes a MODEM connected to the cable 2.

All terminals $3_1$ to $3_{kn+n}$, on one hand, are connected to the center office $1a$ through the cable 2 on the same level. On the other hand, all the terminals $3_1$ to $3_{kn+n}$ are previously grouped into a plurality of terminal blocks 31 to $3k$ as shown in FIG. 1. This blocking, however, is not a hardware construction, but a software definition for carrying out a block polling. The blocking of the terminals is stored in the block polling unit $12a$. In the prior art, each terminal block $31, 32, \ldots, 3k$ consists of up to n terminals. This maximum number of the terminals is the same in each terminal block.

Figure 2:
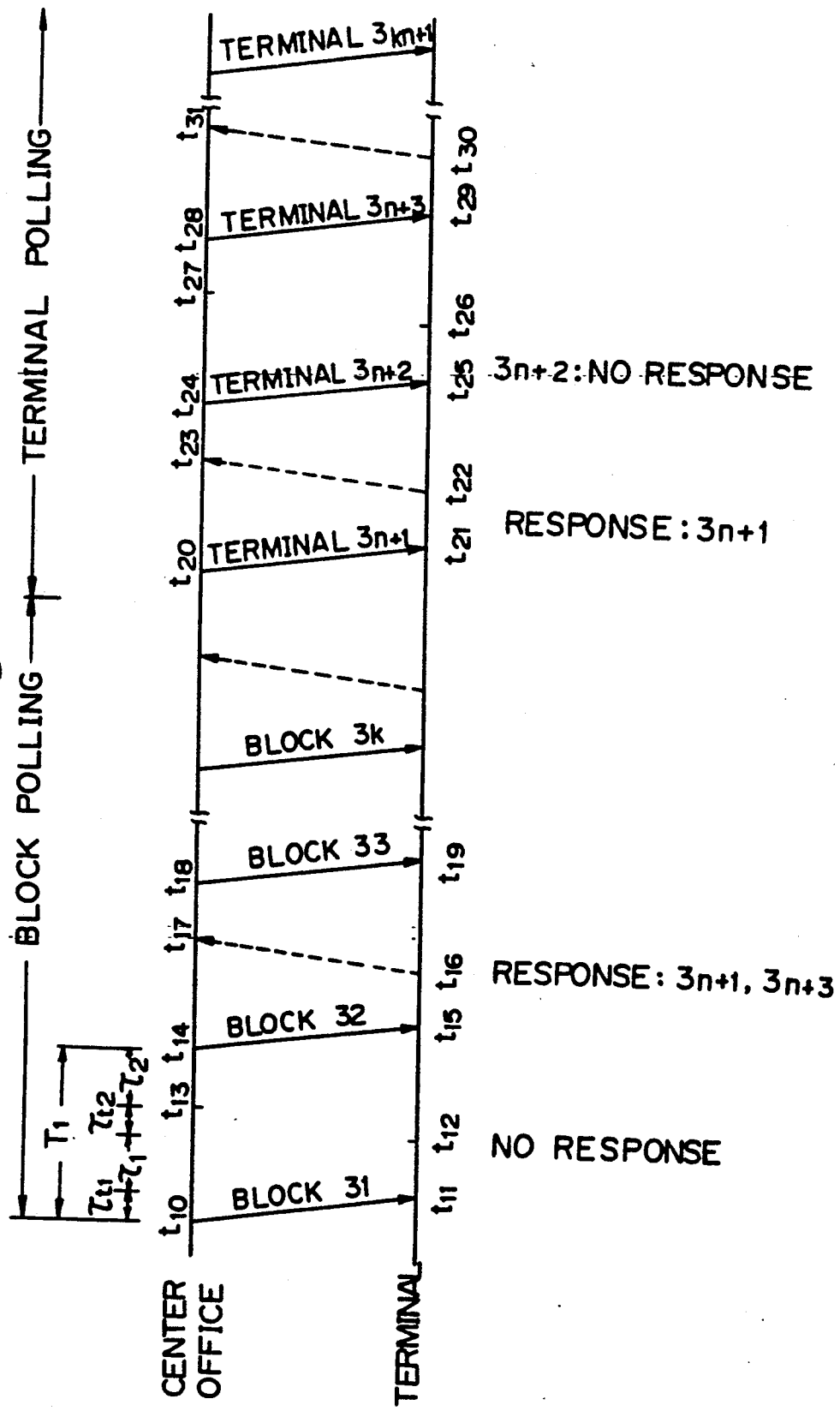
FIG. 2 is a view representing a polling sequence.

Referring to FIG. 2, the polling operation of the block polling data communication system of FIG. 1 will be described. The polling consists of block polling and terminal polling. The block polling and the terminal polling are periodically effected.

First, the block polling is carried out. At time $t_{10}$, the block polling unit $12a$ in the center office $1a$ carries out a polling of a first terminal block 31 consisting of the terminals $3_1$ to $3_n$ through the MODEM 11. A polling signal is propagated on the cable 2 and received at all terminals $3_1$ to $3_{kn+n}$ at time $t_{11}$. Only terminals $3_1$ to $3_n$ which are grouped in the first terminal block 31, respond to the polling signal, and the terminals therein requesting data transfers send request signals for the data transfers to the center office $1a$. In this example, none of the terminals in the terminal block 31 send the requests. At a time $t_{13}$, the response monitor unit $13a$ detects no answer (response) from the terminal block 31. At a time $t_{14}$, the block polling unit $12a$ outputs a polling signal to a second terminal block 32 consisting of the terminals $3_{n+1}$ to $3_{2n}$. All terminals $3_1$ to $3_{kn+n}$ receive the polling signal at time $t_{15}$, but only the terminals $3_{n+1}$ to $3_{2n}$ grouped in the second terminal block 32 respond to the polling signal. In this example, the terminals $3_{n+1}$ and $3_{n+3}$ send carriers as the request signals to the center office $1a$ at a time $t_{16}$. The carriers are received at the response monitor unit $13a$ at a time $t_{17}$. The response monitor unit $13a$ saves these request signals from the terminal block 32. The above block polling can be continued until the block polling of the last terminal block $3k$ is completed. In this example, a terminal in the terminal block $3k$ outputs a carrier as the request signal to the center office $1a$. The response monitor unit $13a$ also saves the request signal from the terminal block $3k$. The block polling is then terminated.

Second, the terminal polling is carried out. The response monitor unit $13a$ designates the terminal blocks 32 and 3k which have requested the data transfer from the center office 1a to the terminal polling unit 14a. At this stage, the specific terminals in the terminal blocks 32 and 3k, which have requested the data transfer from the center office 1a are not identified. The terminal polling unit 14a, first carries out a terminal polling of the terminals $3_{n+1}$ to $3_{2n}$ in the terminal block 32 sequentially. Namely at a time $t_{20}$, the terminal polling unit 14a outputs a polling signal of the terminal $3_{n+1}$. At a time $t_{21}$, all of the terminals receive the polling signal, but only the terminal $3_{n+1}$ sends a request signal for a data transfer to the center office 1a at a time $t_{22}$. At a time $t_{24}$, the terminal polling unit 14a outputs a polling signal of the next terminal $3_{n+1}$. The terminal $3_{n+1}$ does not send a request signal for a data transfer because the terminal $3_{n+1}$ has not requested the data transfer from the center office 1a at this time. At a time $t_{28}$, the terminal polling unit 14a outputs a polling signal of the terminal $3_{n+3}$, and the terminal $3_{n+3}$ sends a request signal. This terminal polling of the terminals in the terminal block 32 is continued until the terminal polling of the last terminal $3_{2n}$ is completed. Thereafter, the terminal polling unit 14a sequentially carries out a terminal polling of all terminals $3_{kn+1}$ to $3_{kn+n}$ in the terminal block 3k, in a similar manner as described above.

The above block polling and the terminal polling are continued repeatedly.

Supposing that a total of the terminals is 30 and the number of the terminal blocks is six, and thus the number n of terminals in each terminal block is five, in the above example, the number of block pollings is six and the number of the terminal pollings is ten (five for the terminals $3_{n+1}$ to $3_{2n}$ and five for the terminals $3_{kn+1}$ to $3_{kn+n}$). Accordingly, the total polling number is 16. If only terminal polling is employed, 30 polling operations must be always effected. Accordingly, a combination of the block polling and the terminal polling discussed above can greatly reduce the number of the pollings, and accordingly, can greatly shorten the polling time.

Generally, a time $T_1$ for each block polling can be expressed by the following formula:

$$T_1 = \tau_1 + \tau_2 + \frac{D_1}{B_r} \quad (1)$$

$$= \tau + \frac{D_1}{B_r}$$

where,
$\tau = \tau_1 + \tau_2$ $\tau_1$ is a response time of the terminal as shown in FIG. 2, $\tau_2$ is a response time of the center office as shown in FIG. 2, $D_1$ is the number of transmission data from the center office to the terminals and from the terminal to the center office, and $B_r$ is a polling speed.

A time $T_B$ for an all block polling can be expressed by the following formula:

$$T_B = \left(\tau + \frac{D_1}{B_r}\right)\frac{y}{n} \quad (2)$$

$$= \left(\tau + \frac{D_1}{B_r}\right) \cdot N_B$$

where $N_B$ is the number of terminal blocks and
$N_B = y/n$,
y is a total number of terminals, thus
$y = k(n+1)$, and
n is the number of terminals in each terminal block.

The time required for each terminal polling is the same as the above each block polling time $T_1$ in the formula (1). When a total number of terminal blocks which include terminals actually requesting data transfer is $B_T$, a total time $T_S$ of the terminal polling can be expressed by the following formula:

$$T_S = T_1 \cdot (n \cdot B_T) \quad (3)$$

$$= \left(\tau + \frac{D_1}{B_r}\right)(n \cdot B_T)$$

Therefore, a total time T of the block polling and the terminal polling is as follows:

$$T = T_B + T_S \quad (4)$$

$$= \left(\tau + \frac{D_1}{B_r}\right)(N_B + n \cdot B_T)$$

$$= \left(\tau + \frac{D_1}{B_r}\right)\left(\frac{y}{n} + n \cdot B_T\right)$$

Supposing that $\tau$, $D_1$, $B_r$, and y are constant, an optimum number n of the terminals in each block and an optimum number $N_B$ of the terminal blocks needed to minimize the total polling time T can be determined.

However, in the prior art, the terminal number n in each terminal block is constant, and thus the total polling time T depends only on $B_T$, which is the total number of the terminal blocks including the terminals requesting a data transfer from the center office. Accordingly, the prior art block polling data communication system still suffers from a drawback of an inability to shorten the total polling time.

Now, embodiments of the block polling data communications systems of the present invention will be described.

Figure 3:
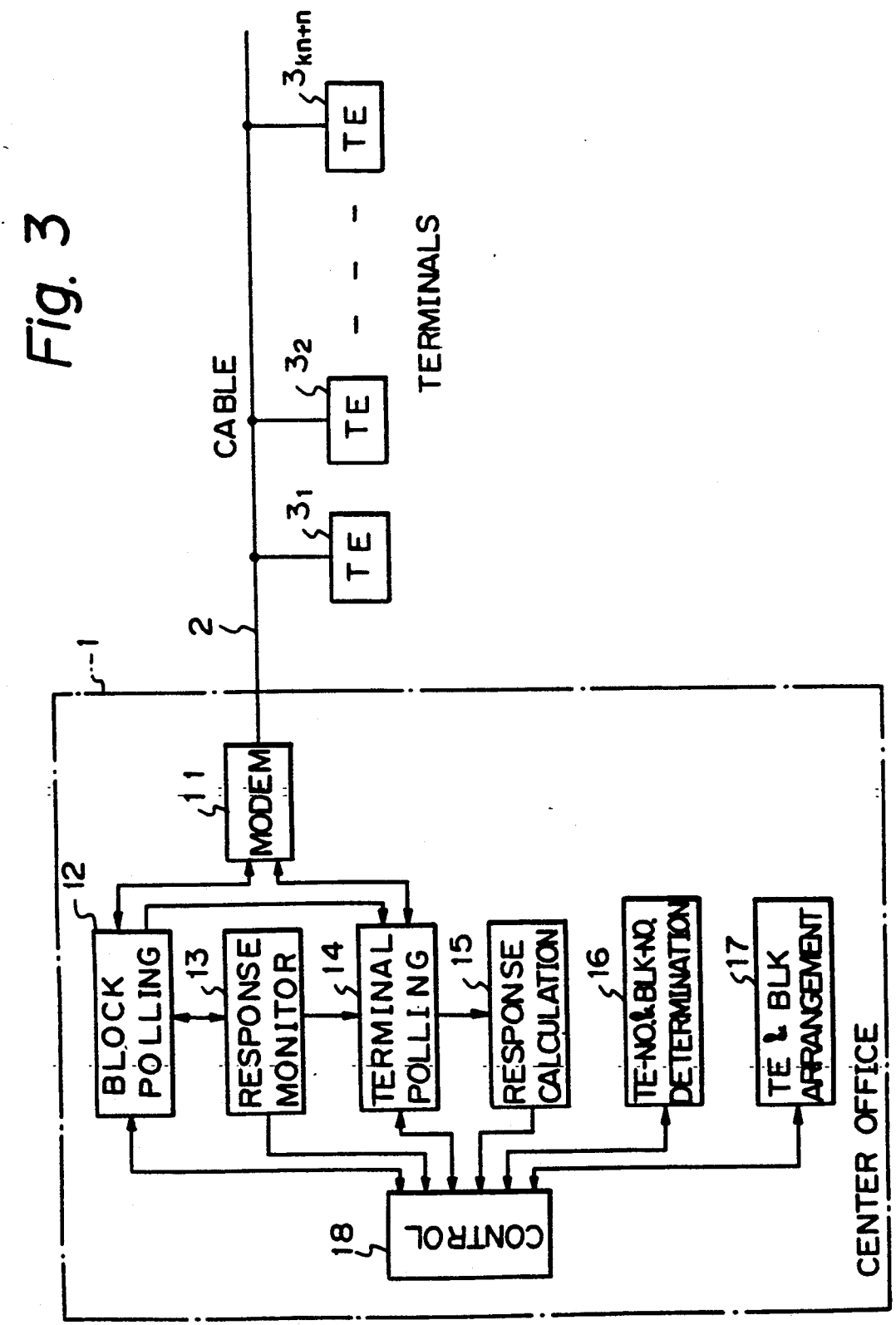
FIG. 3 is a block diagram of an embodiment of a block polling data communication system in accordance with the present invention.

Referring to FIG. 3, an embodiment of a block polling data communication system will be described. The block polling data communication system includes a center office 1, a cable 2, and a plurality of terminals $3_1$ to $3_{kn+n}$. This configuration, per se, is the same as that of FIG. 1.

The center office 1 includes a MODEM 11, a block polling unit 12, a response monitor unit 13, a terminal polling unit 14, and a control unit 18. The center office 1 further includes a response calculation unit 15, a terminal number and block number determination unit 16 and a terminal and block arrangement unit 17. The control unit 18 controls the operation of the above units 12 to 17. The block polling unit 12 effects a block polling. The response monitor unit 13 detects and stores request signals for data transfers from terminal blocks during the block polling, as described later. The terminal polling unit 14 effects a terminal polling of terminals grouped in a terminal block from which the request signal has been issued. The response calculation unit 15 detects a request signal from a terminal during the terminal polling, accumulates the number of request signals from each terminal, and calculates a request ratio. The terminal number and block number determination unit 16 determines an optimum terminal block configuration and an optimum terminal arrangement in each terminal block on the basis of the request ratio obtained at the response calculation unit 15, to minimize the total polling time. The terminal and block arrangement unit 17 allocates the terminal blocks and the terminals in each terminal block determined at the terminal number and block number determination unit 16, to be used at the block polling unit 12 and the terminal polling unit 14.

These units 12 to 18 can be realized by not only a hardware circuit but also a computer program. Also, the response calculation unit 15, the terminal number and block number determination unit 16, and the terminal and block arrangement unit 17 can be incorporated as a single block and terminal allocation unit.

Figure 4:
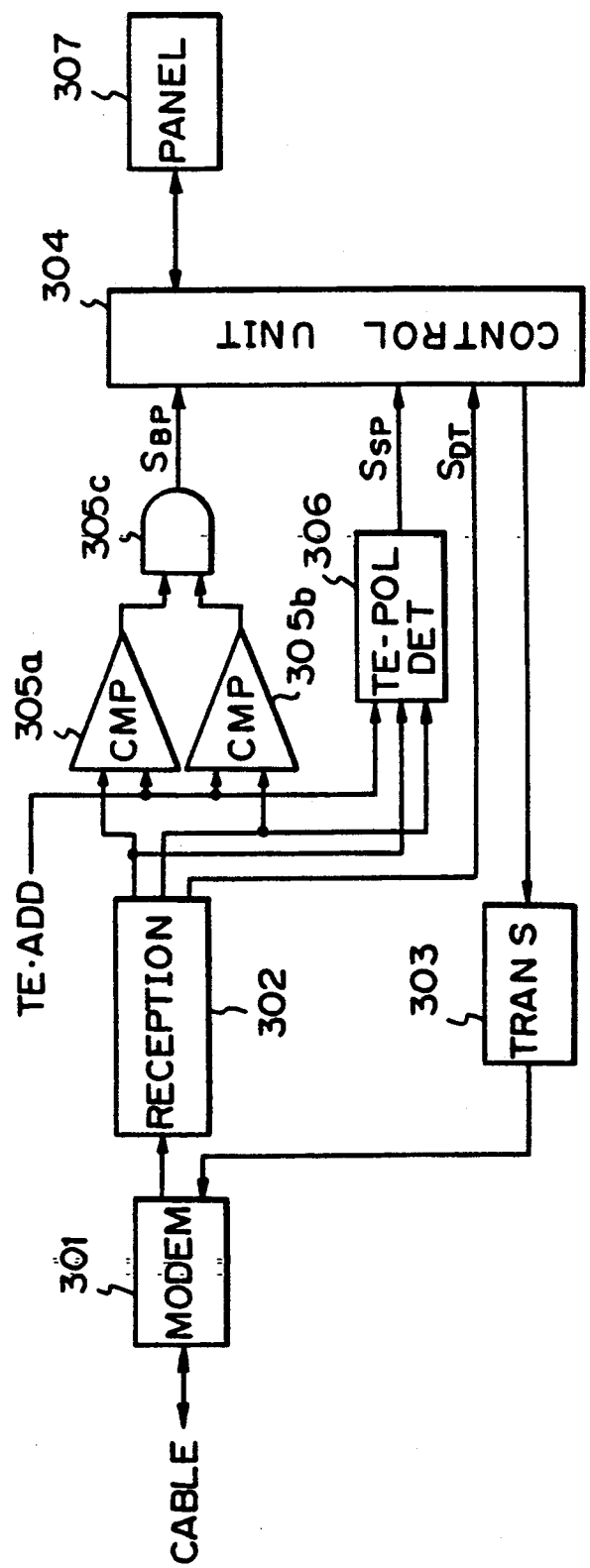
FIG. 4 is a circuit diagram of a terminal shown in FIG. 3.

FIG. 4 shows a circuit diagram of a terminal shown in FIG. 3. In FIG. 4, the terminal includes a MODEM 301 connected to the cable 2, a reception unit 302, a transmission unit 303, a block polling detection circuit 305, a terminal polling detection circuit 306, a control unit 304, and a user's panel 307. Each terminal has a proper terminal address TE-ADD independent of other terminals, and thus each terminal can be identified by a terminal polling when the terminal address is sent from the center office 1. The block polling detection circuit 305 is composed of terminal address comparators 305a and 305b, and an AND gate 305c. The operation of the block polling detection circuit 305 and the terminal polling detection circuit 306 will be described in the description of step S004 of FIG. 5a. The user operates the user's panel 307 when requesting a service from the center office 1. The control unit 304 saves these request signals.

The operation of the block polling data communication system shown in FIG. 3, particularly, the center office 1, and the terminals shown in FIG. 4 will be described with reference to FIGS. 5a and 5b, FIGS. 6a and 6b, FIG. 7 and FIGS. 8a and 8b.

Figure 5A:
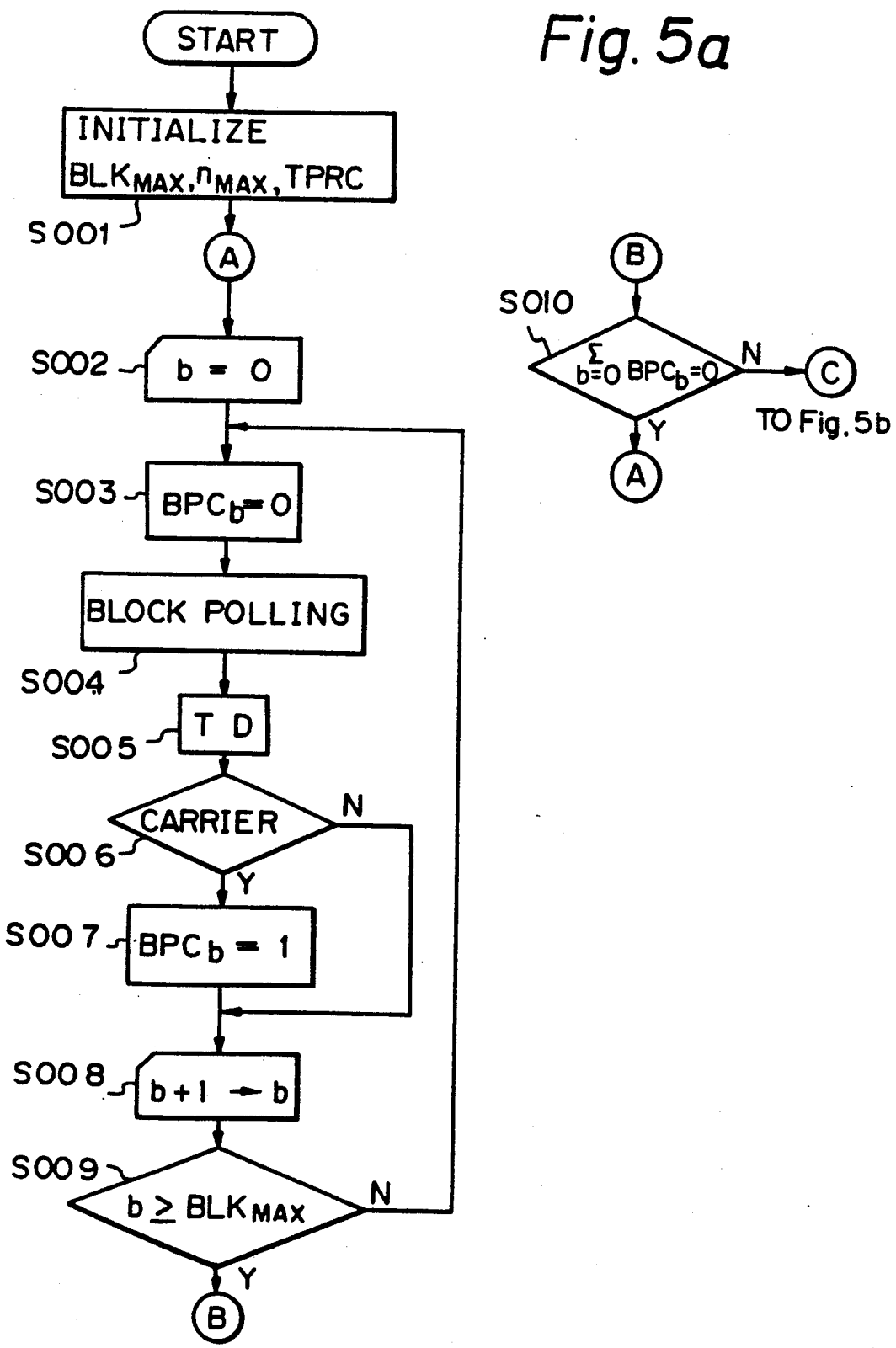
FIGS. 5a and 5b are flow charts explaining the operation of a center office shown in FIG. 3.
Figure 5B:
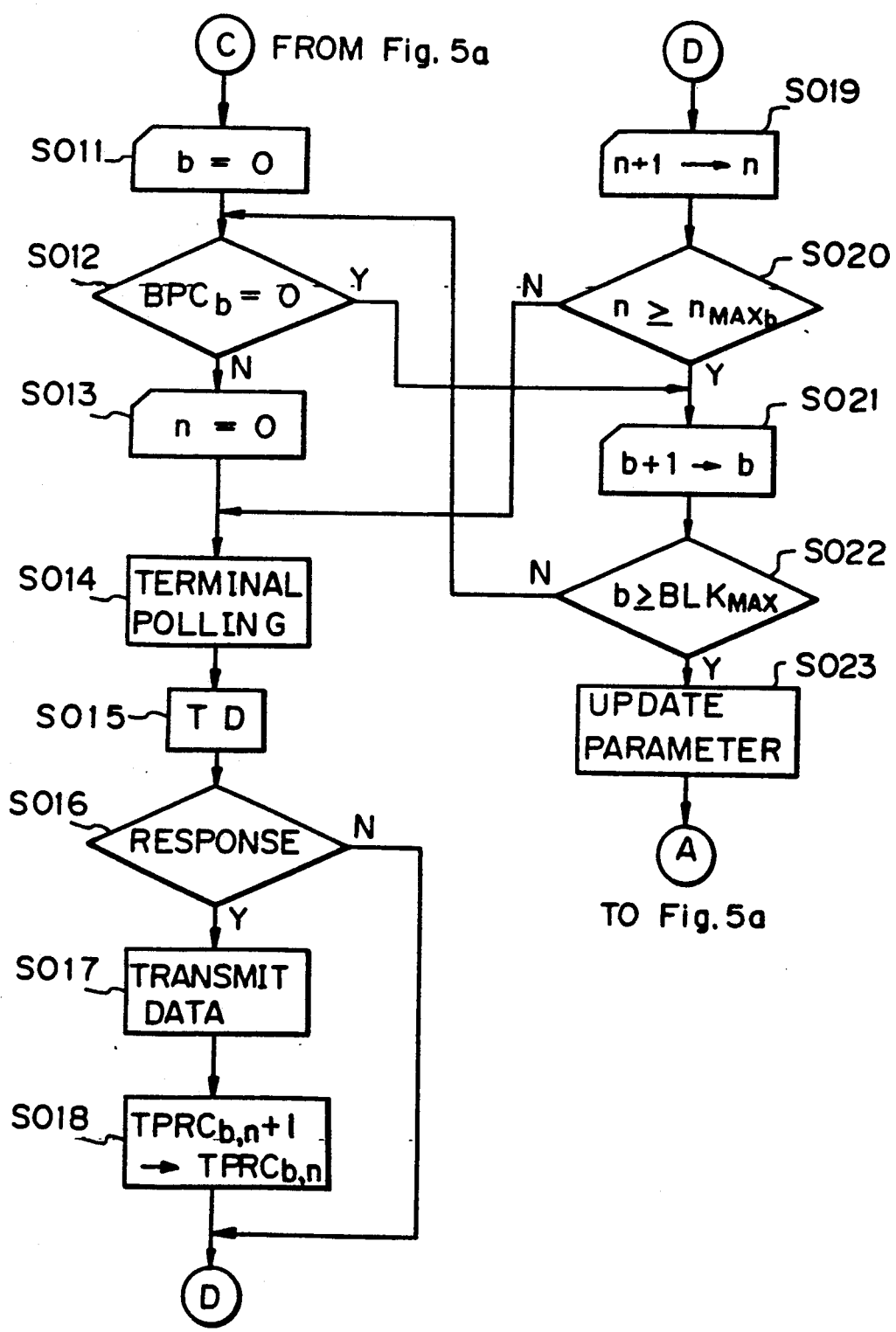
Figure 6A:
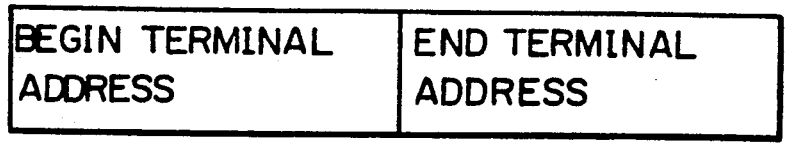
FIGS. 6a and 6b are views of data formats using block polling and terminal polling.
Figure 6B:
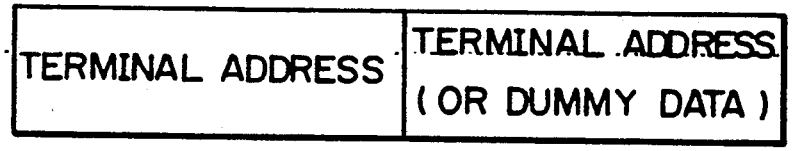

FIG. 5a shows a flow chart of an initialization shown by step S001 and a block polling and response monitor shown by steps S002 to S010. FIG. 5b shows a flow chart of a terminal polling shown by steps S011 to S022 and an update of terminal blocks and terminals therein shown by step S023. The update of terminal blocks and terminals there in will be shown in FIG. 7 in more detail. FIG. 6a shows a part of block polling data. The block polling data of FIG. 6a consists of a begin terminal address and an end terminal address of a terminal block. FIG. 6b shows a part of terminal polling data. The terminal polling data of FIG. 6b consists of two identical terminal addresses. In FIGS. 6a and 6b, the polling data formats are the same. This facilitates the data handling which will be understood later in the following description.

Step S001 in FIG. 5a

The control unit 18 in the center office 1 initiates parameters. When a total terminal number $N_{MAX}$ is 30, the following initial parameters corresponding to the configuration shown in FIG. 8a are provisionally set:

(a) a maximum terminal block number:
$$BLK_{MAX} = 6$$

(b) an arrangement of terminal blocks and terminals therein:
BLOCK 1: terminals $3_1$ to $3_5$
BLOCK 2: terminals $3_6$ to $3_{10}$
BLOCK 3: terminals $3_{11}$ to $3_{15}$
BLOCK 4: terminals $3_{16}$ to $3_{20}$
BLOCK 5: terminals $3_{21}$ to $3_{25}$
BLOCK 6: terminals $3_{26}$ to $3_{30}$ (c) maximum terminal numbers in each terminal block:
$$n_{MAX1} = n_{MAX2} = \ldots = n_{MAX6} = 5$$

The above parameters show the terminal configuration of FIG. 1 when (kn+n) is 30, and n is 5.

The control unit 18 also clears terminal polling rate counters TPRC for all terminals $3_1$ to $3_{30}$.

Step S002 to S010

The block polling unit 12 carries out the block polling in accordance with the above parameters. The response monitor unit 13 detects the issue of a request signal from terminal blocks responded to the block polling and stores the same. The principle of the block polling and the response monitor, per se, is identical to that of the prior art set forth above with reference to FIG. 2.

Step S002

The block polling unit 12 clears a block index b.

Step S003

The block polling unit 12 clears a block polling counter BPC for a first terminal block b=0.

Step S004

The block polling unit 12 carries out a block polling of first terminal block BLOCK 1 consisting of the terminals $3_1$ to $3_5$, as shown in FIG. 8a, at the time $t_{10}$ shown in FIG. 2. The block polling data having the format shown in FIG. 6a are an address "031" indicating the begin terminal address and an address "035" indicating the end terminal address. The block polling unit 12 temporarily stops its operation after setting a time delay as shown by step S005. The length of the time delay is longer than the time $(\tau_{t1}+\tau_1+t_2)$ as shown in FIG. 2; wherein $\tau_{t1}$ and $\tau_{t2}$ are data propagation times on the cable 2, and $\tau_1$ is a response time of the terminals.

A polling signal including the above polling address data is propagated on the cable 2 through the MODEM 11 which modulates the polling signal to be received at all terminals $3_1$ to $3_{30}$ at the time $t_{11}$ shown in FIG. 2.

Each terminal, for example, the terminal $3_1$ having the terminal address TE-ADD "031", shown in FIG. 4, receives the above transmitted and modulated polling signal at the MODEM 301. The MODEM 301 demodulates the received and modulated polling signal, and sends the same to the reception unit 302. The reception unit 302 extracts the above begin terminal address "031" and end terminal address "035". The begin terminal address "031" is supplied to the first terminal address comparator 305a in the block polling detection circuit 305 and the terminal polling detection circuit 306. Also, the end terminal address "035" is supplied to the second terminal address comparator 305b in the block polling detection circuit 305 and the terminal polling detection circuit 306.

The first terminal address comparator 305a compares the terminal address TE-ADD "031" previously set and the begin terminal address "031" and outputs a high level signal when the begin terminal address is equal to or greater than the terminal address TE-ADD. Since the begin terminal address "031" is equal to the terminal address TE-ADD "031" in this case, the first terminal address comparator 305a outputs a high level signal to the AND gate 305c. Also, the second terminal address comparator 305b compares the terminal address TE-ADD "031" and the end terminal address and outputs a high level signal when the end terminal address is equal to or smaller than the terminal address TE-ADD. In this case, the second terminal address comparator 305b also outputs a high level signal to the AND gate 305c. As a result, the AND gate 305c outputs a block polling detection signal $S_{BP}$ to the control unit 304. The terminal polling detection circuit 306 outputs a terminal polling detection signal $S_{SP}$ to the control unit 304 when the begin terminal address is the same as the end terminal address, as shown in FIG. 6b, and the terminal address TE-ADD coincides with the begin terminal address. However, in this case, the terminal polling detection circuit 306 does not output the terminal polling detection signal $S_{SP}$.

Accordingly, the control unit 304 determines the block polling. When a request for a data transfer from the center office 1 through the user's panel 307 exists, the control unit 304 outputs a carrier output signal to the transmission unit 303. The transmission unit 303 outputs a carrier to the center office 1 through the MODEM 301 and the cable 2, at the time $t_{12}$ in FIG. 2. The MODEM 301 modulates the carrier to be compatible with a MODEM protocol. When a data request does not exist, the control unit 304 does not respond to the block polling, and thus the carrier is not output. The time $\tau_1$ between the times $t_{11}$ and $t_{12}$ is the terminal response time.

Other terminals $3_2$ to $3_5$ in the first terminal block carry out the operation in the same way as described above. Other terminals $3_6$ to $3_{30}$ also receive the polling signal at the time $t_{11}$ shown in FIG. 2, but do not respond to the block polling because the terminal addresses thereof are out of a range between the begin and end terminal addresses.

Step S005

At the time $t_{13}$ after the elapse of the time $(\tau_{t1}+\tau_1+t_2)$, the block polling unit 12 receives carriers from the terminals $3_1$ to $3_5$ through the MODEM 11 when any terminal among the terminals $3_1$ to $3_5$ responds to the block polling, and trigger the response monitor unit 13. The MODEM 11 demodulates the carriers.

Steps S006 and S007

The response monitor unit 13 detects the existence of a carrier(s) from the first terminal block. When the carrier(s) exists, the response monitor unit 13 adds one "1" to the block polling counter BPC for the first terminal block. Otherwise, the response monitor unit 13 skips the operation of step S007 and transfers the control to step S008.

Steps S008 and S009

The block polling unit 12 increases the block index b by one. The block polling unit 12 compares the block index b updated by one at step S008 and the maximum terminal block number $BLK_{MAX}$, which is six (6) at the initial condition. When the block index b is not equal to and greater than the maximum terminal block number $BLK_{MAX}$, the above operation of steps S003 to S008 is repeated to detect request signals for data transfers from the terminal blocks to the block polling.

During the block polling, more concretely, at steps S006 and S007, a reception of the carrier(s) from the terminals in each terminal block is detected, however, the terminals from which the carrier(s) is issued can not be identified.

Step S010

When the block index b is equal to the maximum terminal block number $BLK_{MAX}$, the block polling unit 12 checks whether or not all block polling counters BPC are zero, which indicates no response from all terminal blocks. If all of the block polling counters BPC are zero, the control is transferred to step S002, and the block polling is again repeated.

If at least one of all of the block polling counters BPC is not zero, the control is transferred to step S011 shown in FIG. 5b, and the terminal polling is carried out.

Steps S011 to S022

The principle of the terminal polling, per se, is identical to that of the prior art set forth above with reference to FIG. 2, except that, the response calculation unit 15 cooperates with the terminal polling unit 14.

Step S011

The terminal polling unit 14 clears the block index b.

Step S012

The terminal polling unit 14 checks whether or not the block polling counter $BPC_b$ is zero. If the block polling counter $BPC_b$ is zero indicating no-response to the block polling of the (b+1)-th terminal block, the control is transferred to step S021 to advance the block index b.

If the block polling counter $BPC_b$ is not zero, a terminal polling of the terminals in the (b+1)-th terminal block is carried out.

As described above, during the block polling, as the terminals from which the carriers are issued can not be specified, the terminal polling is carried out of all terminals in the terminal block from which the response was made.

In the above example of the prior art, the second terminal block 32 made the response.

Step S013

The terminal polling unit 14 clears a terminal index n.

Step S014

Supposing that, at the initial condition described above, the second (b=1) terminal block 32 has made the response, more specifically, the terminals $3_6$ and $3_8$ have output the carriers as the data requests to the block polling. At the initial condition, the second terminal block 32 includes the terminals $3_6$ to $3_{10}$, and thus the maximum terminal number $n_{MAX2}$ is five.

At the time $t_{20}$, the terminal polling unit 14 outputs a polling signal including the terminal addresses "036" and "036" having the format shown in FIG. 6b to all terminals $3_1$ to $3_{30}$ through the MODEM 11 and the cable 2.

All terminals $3_1$ to $3_{30}$ receive the polling signal at the time $t_{22}$ shown in FIG. 2. Only the terminal $3_6$ detects the terminal polling by the terminal polling detection circuit 306 shown in FIG. 4. The terminal $3_6$ responds to the terminal polling at the time $t_{22}$ shown in FIG. 2 because the terminal $3_6$ has the request for the data transfer.

Steps S015 and S016

After the elapse of a time delay which is equal to the time at step S005, the terminal polling unit 14 receives the request (response) signal for the data transfer from the terminal $3_6$ through the MODEM 11.

When there is no response from the terminal, the terminal polling unit 14 transfers to the operation of step S019.

Steps S017 and S018

The terminal polling unit 14 transmits data to the terminal $3_6$ through the MODEM 11 in response to the request signal from the terminal $3_6$. Thereafter, the terminal polling unit 14 triggers the response calculation unit 15.

The triggered response calculation unit 15 adds one to the terminal polling rate counter TPRC for the terminal $3_6$ and stores same. The terminal polling rate counters TPRC are provided for all terminals $3_1$ to $3_{30}$. These terminal polling rate counters TPRC were cleared at step S001 and can be accessed by terminal number for any given block (b) and terminal within block (n) as indicated in equation (7).

Step S019

The terminal polling unit 14 increases the terminal index n by one.

Step 2020

The terminal polling unit 14 compares the terminal index n and the maximum terminal number $n_{MAX2}$ of the second terminal block. At the initial condition, the maximum terminal number $n_{MAX2}$ is five. If the terminal index n is not equal to or greater than the maximum terminal number $n_{MAX2}$, the control is transferred to step S014, and the terminal polling and the response calculation for a next terminal are carried out.

Steps S021 and S022

The terminal polling unit 14 increases the block index b by one (S021). Thereafter, the terminal polling unit 14 compares the block index b and the maximum terminal block number $BLK_{MAX}$ (S022) At the initial condition, the maximum terminal block number $BLK_{MAX}$ is six ($BLK_{MAX}=6$), as shown in FIG. 8a.

If the block index b is not equal to or greater than the maximum terminal block number $BLK_{MAX}$, the control is transferred to step S012, and the detection and the terminal polling for a next terminal block are effected.

When the block index b equals the maximum terminal block number $BLK_{MAX}$, the control is transferred to step S023.

Step S023

At step S023, the terminal blocks and the terminals in each terminal block are updated to minimize the total polling time. Thus, the maximum terminal block number $BLK_{MAX}$, an arrangement of terminals in each terminal block, i.e. a set of a plurality of pairs of begin and end terminal addresses for the block polling, and the maximum terminal numbers $n_{MAX1}$, $n_{MAX2}$..., are updated.

In this embodiment, the above update is carried out at each polling.

Figure 7:
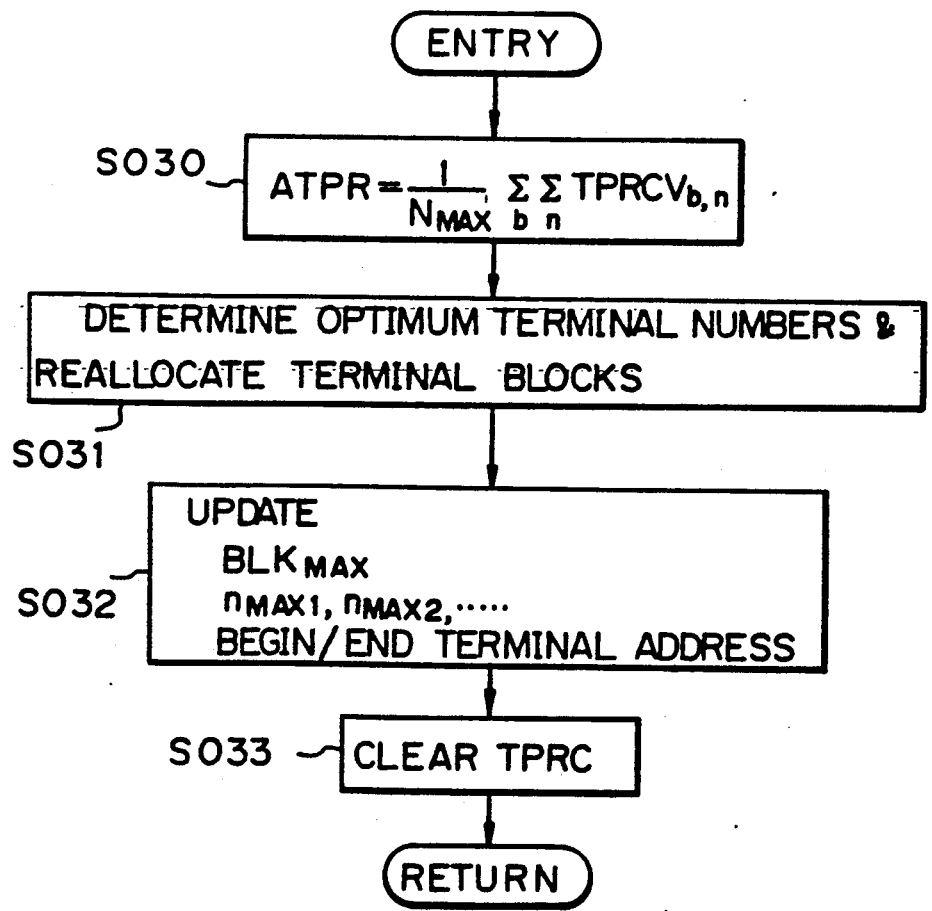
FIG. 7 is a flow chart explaining an optimization of the number of blocks and the number of terminals, at the center office shown in FIG. 3.

Referring to FIG. 7, the update operation will be described.

Step S030

The response calculation unit 15 calculates an average terminal polling ratio ATPR by the following formula:

$$ATPR = \frac{1}{N_{MAX}} \sum_{b=0}^{BLK_{MAX}-1} \sum_{n=0}^{n_{MAX(b)}-1} TPRCV_{b,n} \qquad (5)$$

where, $N_{MAX}$ is the total terminal number, and $$N_{MAX} = \sum_{b=0}^{BLK_{MAX}-1} n_{MAX(b)} \qquad (6)$$

$TPRCV_{b,n}$ represents the terminal polling rate count values of the (n+1)-th terminal in the (b+1)-th terminal block. and these values are stored in the terminal polling ratio counters TPRC. The appropriate TPRC to be accessed by terminal number (TN) is equal to n for block b=0 and can be determined by equation (7) for blocks 1 through $BLK_{MAX}$.

$$TN = \sum_{a=0}^{b} n_{MAX(b)} + n \qquad (7)$$

As described above, since the update is carried out at each polling in this embodiment, each terminal polling ratio count value TPRCV is zero or one.

Step S031

The terminal number and block number determination unit 16 determines the optimum terminal numbers in the respective terminal blocks and allocates the terminal blocks to minimize the total polling time.

An example of the determination is a table look-up manner. Table 1 shows an example of the relationship among the terminal numbers for each terminal block, total polling times in each polling and the average terminal polling ratios ATPR. Data in the Table are previously obtained and previously stored in the terminal number and block number determination unit 16.

TABLE 1

| TE-NOs IN EACH BLOCK | TOTAL POLLING TIME (ms) | | |
|---|---|---|---|
| | ATPR = 0.03 | ATPR = 0.05 | ATPR = 0.2 |
| 1 | 1236 | 1260 | 1440 |
| 2 | 672 | 720 | 1080* |
| 3 | 508 | 580 | 1120 |
| 4 | 444 | 540 | 1260 |
| 5 | 420 | 540* | |
| 6 | 416* | 560 | |
| 7 | 423 | 591 | |
| 8 | 438 | 630 | |

The terminal number and block number determination unit 16 searches a minimum total polling time on the basis of the average terminal polling ratio ATPR. When the ATPR=0.03, the minimum total polling time is 416 ms, and thus an optimum terminal number $n_{MAX}$ is six (6). In this embodiment, the optimum number in each terminal block is equal, and thus $n_{MAX1}$ to $n_{MAX5}$ are equal, i.e. six (6). Consequently, an optimum terminal block number, i.e., the maximum terminal block number $BLK_{MAX}$ is five.

Step S032

The terminal and block arrangement unit 17 updates the maximum terminal block number $BLK_{MAX}$ to five $BLK_{MAX}=5$, the maximum terminal numbers in the terminal blocks $n_{MAX1}, n_{MAX2}, \ldots, n_{MAX5}$ to six ($n_{MAX1}=n_{MAX2}=\ldots n_{MAX5}=6$), and a plurality of pairs of the begin and the end terminal addresses of the respective terminal blocks. The update is shown in FIG. 8b.

Step S033

The terminal and block arrangement unit 17 clears all the terminal polling ratio counters TPRC.

Referring to FIGS. 5a and 5b, after the completion of the operation of step S023 described with reference to FIG. 7, the block polling of steps S002 to S010 and the terminal polling of steps S011 to S022 are carried out in accordance with the above updated parameters: $BLK_{MAX}, n_{MAX1}, n_{MAX2}, \ldots, n_{MAX5}$, pairs of begin and end terminal addresses.

Also, the update of the parameters is again effected. Thus, the block polling, the terminal polling and the parameter update are repeatedly continued. As a result, a total polling time is minimized. This also results in a quick response to a user's demand (request).

Referring again to Table 1, when the average terminal polling ratio ATPR is 0.05 (ATPR=0.05, there are two minimum total polling times of 540 ms. Apparently, a choice of five terminal numbers in each terminal block results in smaller block polling times rather than that of a choice of four terminal numbers. Therefore, the terminal number and block number determination unit 16 selects the largest terminal numbers when there are two or more minimum total polling times.

A second embodiment of the block polling data communication system of the present invention will be described.

In the above embodiment, the parameter update is carried out at each polling. This parameter update may result, in a great and high-frequency parameter change. To avoid this, the parameter update can be carried out only after a long period, for example, every ten minutes, one hour, one day or one week. In this case, the operation of step S023 is omitted from FIG. 5b, and the operation of steps S030 to S033 of FIG. 7 is periodically controlled by the control unit 18 and executed every ten minutes, one hour, one day or one week. Also, in this case, the response calculation unit 15 accumulates the terminal polling ratio counters TPRC at step S018 shown in FIG. 5b and calculates the terminal polling ratio ATPR of the accumulated terminal polling ratio count values TPRCV by the formula (5). The determination principle of the terminal number and block number determination unit 16 is the same as that set forth above.

The parameter update can also be carried out by operator demand at the center office 1.

A third embodiment of the block polling data communication system of the present invention will be described. In, the above embodiments, all maximum terminal numbers $n_{MAX(b)}$, where b denotes the block index, are equal. However, these maximum terminal numbers should be varied in accordance with the data transfer requests to further minimize the total polling time, because, as described above, a distribution of the data transfer requests can greatly vary depending on the regions where the terminals are installed, the time of day, service programs, etc.

An example of this will be described with reference to FIG. 9. FIG. 9 shows a distribution of the data transfer requests from the terminals during the terminal polling and counted at the response calculation unit 15 during one polling period. In this case, the maximum block number $BLK_{MAX}$ is previously defined up to ten (10), the maximum terminal number $n_{MAX}$ is previously defined up to seven (7), and a minimum terminal number is previously defined as one (1). Under the above predefined parameter limitations, the terminal number and block number determination unit 16 uses the formula (4) to minimize the total polling time T by, for example, a variety of mathematical programming (MP) techniques, or dynamic programming, such as an operations research (OR) program. Namely, the terminal number and block number determination unit 16 first obtains respective optimum terminal numbers $n_{MAX}$, and subsequently reallocates respective terminal blocks. FIG. 8c shows an allocation of the terminals.

A fourth embodiment of the block polling data communication system of the present invention will be described.

This embodiment applies the variable maximum terminal number determination for a single polling of the third embodiment to a variable maximum terminal number determination for the long period described in the second embodiment.

An example of this will be described with reference to FIG. 10. FIG. 10 shows a distribution of histograms of the data transfer requests from the terminals during the terminal polling. The counted values at the response calculation unit 15 for the long period show the histograms. In this case, the predefined parameters are same as those in the third embodiment.

Under the above predefined parameter limitations, the terminal number and block number determination unit 16 uses the formula (4) to minimize the total polling time T by, for example, a variety of mathematical programming, so that respective optimum terminal numbers $n_{MAX}$ are obtained, and subsequently, respective terminal blocks are determined.

Figure 11:
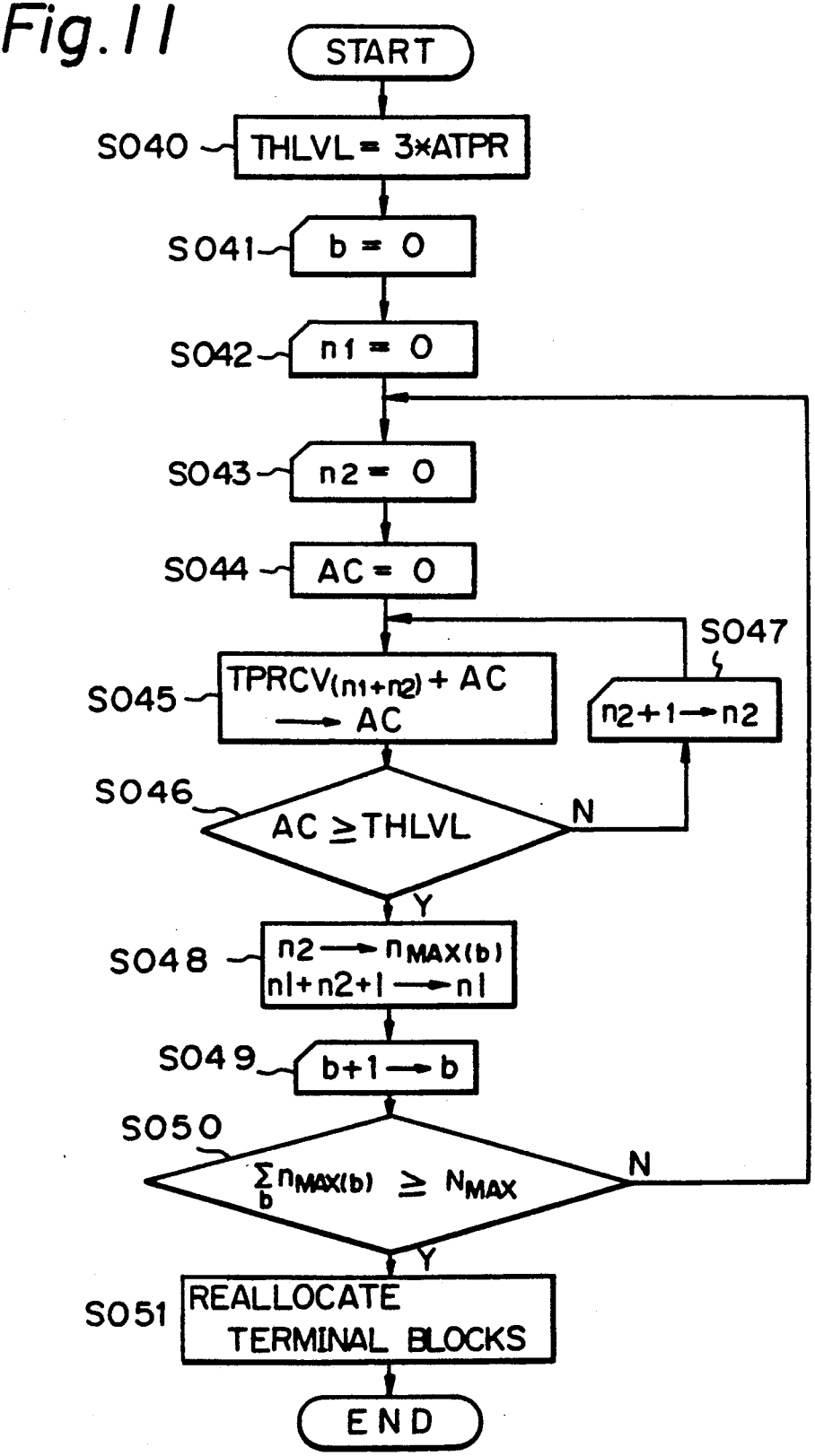
FIG. 11 is a flow chart explaining a determination of optimum terminal numbers and terminal blocks by a terminal number and terminal block determination unit shown in FIG. 3.

Another determination of optimum terminal numbers $n_{MAX}$ and terminal blocks will be described with reference to FIG. 11. FIG. 11 shows a flow chart of the operation of the terminal number and terminal block determination unit 16. In this example, the average terminal polling ratio ATPR obtained at the response calculation unit 15 by the formula (5) is used.

Step S040

The terminal number and terminal block determination unit 16 calculates a threshold level THLVL such that THLVL=3.ATPR. Three (3) is a provisional value for grouping the terminal blocks.

Steps S041 and S042

The terminal number and terminal block determination unit 16 initializes a block index b and a first terminal index n1.

Steps S043 and S044

The terminal number and terminal block determination unit 16 clears a second terminal index n2 and an accumulation counter AC.

Step S045

The terminal number and terminal block determination unit 16 accumulates the terminal polling ratio count value TPRCV obtained at the response calculation unit 15 by modifying the first and second indices n1 and n2.

Steps S046 and S047

The terminal number and terminal block determination unit 16 compares a value in the accumulation counter AC and the threshold level THLVL. When the value in the accumulation counter AC is not equal to or greater than the threshold level THLVL, the second terminal index n2 is increased by one, and again the operation of step S045 is repeated.

Steps S048 to S049

When the value of the accumulation counter is equal to or greater than the threshold level THLVL, the value of the second terminal index n2 is set to an optimum terminal number $n_{MAX(b)}$ of a (b+1)-th terminal block, and the first terminal index n1 is incremented by the second terminal index n2 plus one.

The block index b is increased by one.

Step S050

The terminal number and terminal block determination unit 16 accumulates obtained optimum terminal numbers $n_{MAX(b)}$ and checks whether or not the accumulated optimum terminal number is equal to or greater than the total terminal number $N_{MAX}$.

When the accumulated optimum terminal number is not equal to or greater than the total terminal number $N_{MAX}$, the determination of the optimum terminal number is continued.

Step S051

When the accumulated optimum terminal number reaches the total terminal number $N_{MAX}$, the terminal number and terminal block determination unit 16 determines terminal blocks in accordance with the obtained optimum terminal numbers $n_{MAX(b)}$.

The lower portion of FIG. 10 and FIG. 8c show the obtained terminal numbers and the determined terminal blocks.

The terminal and block arrangement unit 17 reallocates the terminal blocks and sets the begin and end terminal addresses therefor.

The block polling and the terminal polling are carried out in accordance with the above determined parameters.

Many widely different embodiments of the present invention may be constructed without departing from the spirit and scope of the present invention, and it should be understood that the present invention is not restricted to the specific embodiments described above, except as defined in the appended claims.

I claim:

1. A block polling data communication system, comprising:
 a center office;
 a plurality of terminals, divided into a plurality of terminal blocks, each including at least one terminal; and
 a cable connecting the center office and the terminals, said center office including
  block polling means for performing operations polling the terminal blocks,
  response monitor means, operatively connected to the block polling means to cooperate therewith, for detecting and storing a request signal for a data transfer for a terminal in the terminal block of which the polling is effected,
  terminal polling means, operatively connected to the response monitor means, for performing operations sequentially polling all of the terminals in each terminal block in which at least one terminal responded to the polling and issued the request for the data transfer, and
  terminal and block rearrangement means for obtaining an average frequency of occurrences of requests from all of said terminals by counting a number of requests received in said center office from among all of said terminals and dividing by a number of times each of said terminals was polled, determining an optimum number of terminal blocks based on the average frequency so that a total polling time for the operations by said block polling means and said terminal polling means is minimized, and allocating said terminals into said optimum number of terminal blocks,
 the block polling means effecting the polling of the terminal blocks rearranged by the terminal and block rearrangement means, and
 the terminal polling means effecting the polling of each terminal in the terminal blocks determined at the terminal and block rearrangement means in which at least one terminal responded to the polling from the block polling means.

2. A block polling data communication system according to claim 1, wherein
 each terminal has a terminal address,
 the block polling means outputs a pair of a begin terminal address and an end terminal address of the terminal block to be polled in the block polling of all of the terminals, the begin terminal address and the end terminal address of each terminal block being defined by the arrangement of the terminal in each determined terminal block, the terminals responding to the block polling when the terminal addresses thereof are within the begin and end terminal addresses and the terminals have requested data transfers from the center office, and
 the terminal polling means outputs a terminal address of the terminal to be polled in the terminal polling, the terminal responding to the terminal polling when the terminal address coincides with the terminal address thereof and the terminal has requested the data transfer from the center office.

3. A block polling data communication system according to claim 2,
 wherein said center office and each of said terminals includes
  a MODEM unit, operatively connected to said cable, for modulating transmission data and demodulating reception data,
  reception means, operatively connected to the MODEM unit, for receiving data transmitted via said cable,
  transmission means, operatively connected to the MODEM unit, for transmitting data over said cable, and
 wherein each of said terminals further includes
  block polling detection means, operatively connected to the reception means, for detecting a block polling by comparing the terminal address thereof and the begin and end terminal addresses from the reception means, terminal polling detection means, operatively connected to the reception means, for detecting the terminal polling thereof by comparing the terminal address thereof and the terminal address from the center office, and control means, operatively connected to the block polling detection means, the terminal polling detection means and the transmission means, for outputting the request signal to the center office through the transmission means and the MODEM unit in response to the block polling or the terminal polling.

4. A block polling data communication system according to claim 1, wherein said terminal and block rearrangement means comprises:

response calculation means for calculating an average terminal polling ratio indicating the average frequency of occurrences of requests;

terminal block number determination means for determining the optimum number of terminal blocks using a table relating the average terminal polling ratio to numbers of terminals per block; and arrangement means for allocating said terminals into the optimum number of terminal blocks with each terminal block having a number of terminals differing by not more than one from a number of terminals per block obtained by a table look-up using the average terminal polling ratio.

5. A block polling data communication system according to claim 4, wherein the terminal and block rearrangement means is operated after every completion of the polling by the terminal polling means.

6. A block polling data communication system according to claim 4, wherein the terminal and block rearrangement means is operated at predetermined intervals.

7. A block polling data communication system according to claim 4, wherein the terminal and block rearrangement means is operated on demand.

8. A block polling data communication system according to claim 1, wherein the terminal and block rearrangement means determines optimum terminal numbers in each terminal block to minimize the total polling time, the respective optimum terminal numbers of the terminal blocks being determined by a mathematical programming, and rearranges terminal blocks in accordance with the determined optimum terminal numbers.

9. A block polling data communication sysstem according to claim 8, wherein the terminal and block rearrangement means is operated after every completion of the polling by the terminal; polling means 10. A block polling data communication system according to claim 8, wherein the terminal block rearrangement means is operated at predetermined intervals.

11. A block polling data communcation system according to claim 8, wherein the terminal and block rearrangement means is operated on demand.

12. A block polling data communcation system according to claim 1, wherein the terminal and block rearrangement means calculates an average request ratio, defines a threshold level in accordance with the average request ratio, and determines terminal numbers and terminal blocks by accumlating the counted request number of the terminals during the terminal polling and comparing the accumulated request number and the threshold level.

13. A block polling data communication system according to claim 12, wherein the terminal and block rearrangement means is operated after every completion of the polling by the terminal polling means.

14. A block polling data communication system according to claim 12, wherein the terminal and block rearrangement means is operated at predetermined intervals of time.

15. A block polling data communication system according to claim 12, wherein the terminal and block rearrangement means is operated on demand.

16. A block polling data communication system according to claim 1, wherein said terminal and block rearrangement means further determines an optimum average number of terminals to be included in each terminal block based on the average frequency, and divides said terminals as evenly as possible into the terminal blocks, each terminal block including a number of terminals within one of the optimum average number of terminals.

17. A block polling data communication system according to claim 1, wherein said terminal and block rearrangement means comprises:

response calculation means for calculating an average terminal polling ratio indicating the average frequency of occurrences of requests;

terminal block number determination means for determining the optimum number of terminal blocks using a table relating the average terminal polling ratio to numbers of terminals per block; and arrangement means for allocating said terminals into the optimum number of terminal blocks with each terminal block having a number of terminals differing by not more than one from a number of terminals per block obtained by a table look-up using the average terminal polling ratio.

18. A method for polling terminals in a data communication system from a center office to obtain data requests, the terminals being divided into a plurality of terminal blocks each having at least one terminal, comprising the steps of:

(a) polling each of the terminal blocks for at least one data request from the terminals in each terminal block;

(b) polling each of the terminals in the terminal blocks having at least one data request from the terminals therein;

(c) rearranging the terminals to form new terminal blocks, based on the data requests from the terminals, to minimize total polling time, said rearranging comprising the substeps of (c1) counting a number of terminals polled and the data requests from all of the terminals to obtain a total number of requests;

(c2) obtaining an average frequency of occurrences of requests from all of the terminals by dividing the total number of requests received in the center office by the number of terminals polled during said counting in step (c1);

(c3) determining an optimum number of the terminal blocks based on the average frequency to minimize total polling time of said polling in steps (a) and (b);

(c4) allocating the terminals into the optimum number of terminal blocks; and (d) repeating said polling in steps (a) and (b).

19. A method for polling terminals according to claim 18, wherein said step (c) is repeated at predetermined intervals.

20. A method for polling terminals according to claim 18, wherein said step (c) is repeated after every occurrence of step (b).

21. A method for polling terminals according to claim 18, wherein
said step (a) comprises the substeps of:
(i) sequentially outputting a pair of a begin terminal address and an end terminal address for each terminal block, the begin terminal address and the end terminal address of each terminal block defined by the arrangement of the terminals in each terminal block; and
(ii) receiving the data requests from any terminal in each polled block, and
step (b) comprises the substeps of:
(i) outputting a terminal address of each terminal to be polled, and
(ii) receiving the data requests from each polled terminal requesting data.

22. A method for polling terminals according to claim 18, wherein
said step (c) comprises the substeps of:
(i) calculating an average request ratio;
(ii) comparing the average request ratio to a table containing total polling time depending upon average request ratios and terminal numbers; and
(iii) determining the number of terminals to be included in each terminal block.

23. A method for polling terminals according to claim 18, wherein
said step (c) comprises the substep of:
(i) determining a respective optimum number of terminals for each terminal block by a mathematical programming.

24. A method of polling terminals according to claim 18, wherein
said step (c) comprises the substeps of:
(i) calculating an average request ratio;
(ii) calculating a threshold level based on the average request ratio;
(iii) accumulating and counting the data requests made during the terminal polling; and
(iv) comparing the counted number of data requests and the threshold level to determine a number of terminals for each terminal block.

25. A method according to claim 18, wherein said allocating in substep (c4) comprises the substeps of:
(c4A) determining an optimum average number of terminals to be included in each terminal block based on the average frequency; and
(c4B) dividing said terminals as evenly as possible into the terminal blocks, with each terminal block including a number of terminals within one of the optimum average number.

26. A method according to claim 18, wherein said allocating in substep (c4) comprises the substeps of:
(c4A) determining a threshold valued based on the average frequency;
(c4B) accessing results of a polling of all of the terminals in a predetermined fixed sequence;
(c4C) accumulating a number of the data requests received from a series of the terminals in the predetermined fixed sequence until the threshold value is exceeded;
(c4D) allocating one of the terminal blocks with the series of the terminals producing the number of data requests accumulated in step (c4C); and
(c4E) repeating steps (c4C) and (c4D) until the entire predetermined fixed sequence is completed.

27. A block polling data communication system, comprising:
a center office;
a plurality of terminals, divided into a plurality of terminal blocks, each including a substantially equal number of terminals; and
a cable connecting the center office and the terminals,
said center office including
block polling means for performing operations polling the terminal blocks,
response monitor means, operatively connected to the block polling means to cooperate therewith, for detecting and storing a request signal for a data transfer for a terminal in the terminal block of which the polling is effected,
terminal polling means, operatively connected to the response monitor means, for performing operations sequentially polling all of the terminals in each terminal block in which at least one terminal responded to the polling and issued the request for the data transfer, and
terminal and block rearrangement means for obtaining an average frequency of occurrences of requests from all of said terminals by counting a number of requests received in said center office from among all of said terminals and dividing by a number of times each of said terminals was polled, determining an optimum number of terminal blocks based on the average frequency so that a total polling time for the operations by said block polling means and said terminal polling means is minimized, and allocating said terminals into said optimum number of terminal blocks as evenly as possible,
the block polling means effecting the polling of the terminal blocks rearranged by the terminal and block rearrangement means, and
the terminal polling means effecting the polling of each terminal in the terminal blocks determined at the terminal and block rearrangement means in which at least one terminal responded to the polling from the block polling means.

* * * * *

UNITED STATES PATENT AND TRADEMARK OFFICE
CERTIFICATE OF CORRECTION

PATENT NO. : 5,010,329

DATED : April 23, 1991

PAGE 1 OF 2

INVENTOR(S) : Nagakura

It is certified that error appears in the above-identified patent and that said Letters Patent is hereby corrected as shown below:

Title page, [57], under "Abstract", line 3, "out" should be --out and,--;

Col. 4, line 3, after "DETAILED" insert --DESCRIPTION OF THE--;
line 42, "$3_n$" should be --$3_n$,--.

Col. 7, line 51, "there in" should be --therein--.

Col. 8, line 2, delete the word "indent".

Col. 13, line 4, "$BLK_{MAX}$" should be --$BLK_{MAX}$,--;
line 9, "$BLK_{MAX} = 5$," should be --($BLK_{MAX} = 5$),--;
line 10, "$(n_{MAX}-)$" should be --$(n_{MAX1})$--;
line 11, delete "i";
line 31, "0.05," should be --0.05),--;
line 64, "In," should be --In--.

Col. 14, line 25, "will," should be --will now--.

UNITED STATES PATENT AND TRADEMARK OFFICE
CERTIFICATE OF CORRECTION

PATENT NO. : 5,010,329
DATED : April 23, 1991
INVENTOR(S) : Nagakura

It is certified that error appears in the above-identified patent and that said Letters Patent is hereby corrected as shown below:

Col. 15, line 20, "set" should be --assigned--.
Col. 17, line 32, "claim4" should be --claim 4--;
       line 50, "sysstem" should be --system--;
       line 54, "terminal;" should be --terminal--;
       line 56, after "terminal" insert --and--;
       lines 59 & 62, "communcation" should be --communication--;
       line 67, "accumlating" should be --accumulating--.
Col. 20, line 3, "valued" should be --value--.

Signed and Sealed this

Third Day of November, 1992

Attest:

DOUGLAS B. COMER

Attesting Officer      Acting Commissioner of Patents and Trademarks